UNITED STATES PATENT OFFICE.

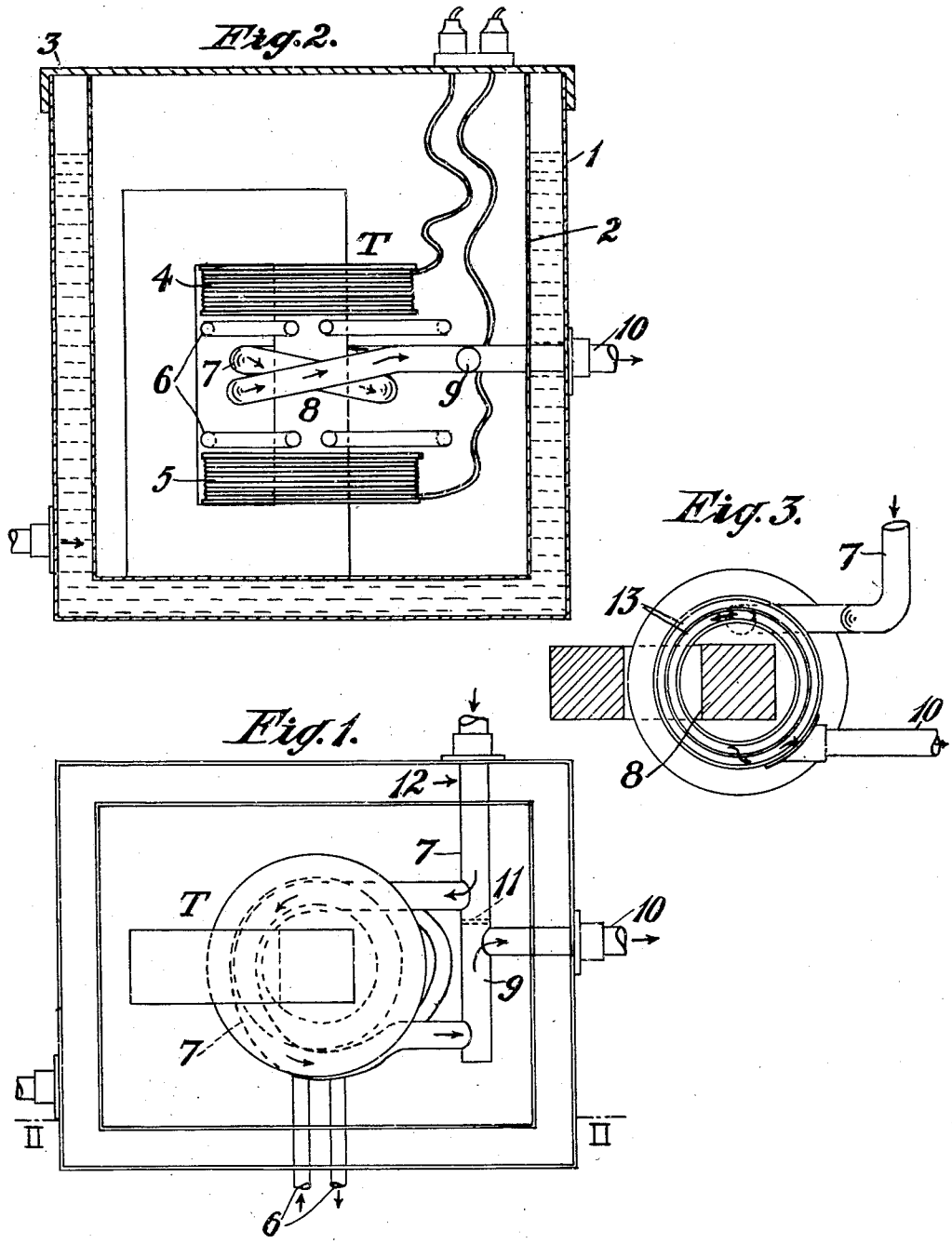

ROBERT JOHN FROST, OF CLAYTON, VICTORIA, AUSTRALIA.

ELECTRIC WATER HEATER.

1,406,181.  Specification of Letters Patent.  Patented Feb. 14, 1922.

Application filed August 27, 1920. Serial No. 406,452.

*To all whom it may concern:*

Be it known that I, ROBERT JOHN FROST, a subject of the King of Great Britain, of Clayton, in the State of Victoria, Commonwealth of Australia, electrical engineer, have invented certain new and useful Improvements in Electric Water Heaters, (for which I filed an application in Australia Aug. 25, 1919,) of which the following is a specification.

This invention appertains to the utilization of electric current energy for the purpose of heating water and if required converting same to steam for power purposes.

Various electric water heaters have been devised from time to time in which a short circuited resistance element inserted in the power circuit is employed as the actual heating element, but to date a commercially successful efficient heater has not been produced. It is the objective of the present invention to provide an electric water heater of the simplest character free from complexities of construction and possessing a high degree of thermal efficiency relative to the current absorption.

Briefly stated the invention resides in the employment of metallic water conduit or conduits so associated with an alternating or fluctuating current transformer as to constitute the secondary circuit of the latter the metallic conduit being short circuited and the water to be heated is caused to flow therethrough either under pressure or thermosyphon.

The accompanying drawings depict practical applications of the invention—

Fig. 1 being a plan, and

Fig. 2 a vertical section on line 11—11 thereof

Fig. 3 a horizontal section through the transformer illustrating a modification of construction.

Referring particularly to Figs. 1 and 2 of these drawings it will be seen that the transformer T is located within a casing 1 provided with a water jacket 2 and a cover 3 and the primary conductors 4, 5, are protected against destructive heat effect by water circulating conduits 6.

The metallic pipe or water conduit 7 through which the water to be heated passes is turned around the core 8 of the transformer to form a secondary circuit, said pipe being short circuited by a bridge 9 and connected with a delivery pipe 10 so that the current induced in the secondary circuit constituted by said conductor 7 heats the water passed by pressure therethrough.

Consequent upon the circulation of the water through the secondary circuit water conductor the efficiency is exceedingly high owing to the direct conversion of the electrical energy without any intervening medium.

As illustrated, the water is prevented from passing directly to the delivery pipe 10 by a plug or partition 11 placed in the bridge 9.

If desired water from the jacket 2 may be delivered at 12 into pipe 7 but as illustrated the pipe 7 leads through the vessel to the source of supply.

Fig. 3 shows means for connecting the water conduit 7 with annular connected containers 13 made narrow to split the volume of water into thin streams, and provide increased heating surfaces.

When the invention is applied to steam generation the conduit 7 is carried into the steam generator and short circuited therein, it being preferable in order to attain maximum effect that at the point of the short circuiting bridge or bridges the conductor is of reduced bore relative to those portions located in proximity to the transformer.

The transformer employed to effect the invention will be of the step-down type in which the current in the primary coils will be of comparatively high potential whilst that in the secondary will be particularly low and reduced to a fraction of one volt with a consequent high factor of amperage.

It is to be clearly understood that the invention is not to be regarded as restricted in its scope to any special practical incorporation of the use of the water conduits with an alternating or fluctuating current transformer, as same may be effected in a variety of ways according to the special requirement of any particular case and the design of the transformer employed.

From the foregoing it will be readily appreciated that in its broadest aspect the invention consists in heating water by passage through the zone of heat generated in a metallic short circuited conduit forming the secondary circuit in an alternating or fluctuating current transformer.

I claim:—

1. An electric heater comprising a core, a primary winding therefor, divided into two coils, a liquid conductor between said coils forming a secondary winding, and a liquid conduit communicating with the inlet and discharge ends of the conductor and electrically short circuiting the latter.

2. An electric water heater, comprising a rectangular core having a central opening, a primary winding divided into two coils passing through said opening, a liquid conductor forming a secondary winding passing through said opening between the two coils and electrically short circuited, and separate cooling conduits between each coil and liquid conductor.

3. An electric water heater, comprising a rectangular core having a central opening, a primary winding divided into two coils passing through said opening, a liquid conductor forming a secondary winding passing through said opening between the two coils, a conduit electrically short circuiting the liquid conductor, said conduit having a discharge and a partition therein between the inlet end of said conductor and the discharge.

Dated this thirteenth day of July, 1920.

ROBERT JOHN FROST.